United States Patent
Bono et al.

(10) Patent No.: US 9,940,331 B1
(45) Date of Patent: Apr. 10, 2018

(54) PROACTIVE SCAVENGING OF FILE SYSTEM SNAPS

(71) Applicant: EMC Corporation, Hopkinton, MA (US)

(72) Inventors: Jean-Pierre Bono, Westborough, MA (US); Xiaoye Jiang, Shrewsbury, MA (US); William C. Davenport, Burlington, MA (US); Philippe Armangau, Acton, MA (US); Yingchao Zhou, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 861 days.

(21) Appl. No.: 14/319,660

(22) Filed: Jun. 30, 2014

(51) Int. Cl.
*G06F 17/30* (2006.01)

(52) U.S. Cl.
CPC ............... *G06F 17/30088* (2013.01)

(58) Field of Classification Search
CPC ........... G06F 17/30088; G06F 2201/84; G06F 11/1451; G06F 11/1435; G06F 11/1458; G06F 11/1471; G06F 17/30233; G06F 2201/82; G06F 3/065; G06F 3/067; G06F 17/30079; G06F 17/30082; G06F 17/30221
USPC ........................................................ 707/639
See application file for complete search history.

(56) References Cited

U.S. PATENT DOCUMENTS

| | | | |
|---|---|---|---|
| 7,873,619 B1 * | 1/2011 | Faibish | G06F 17/30091 707/705 |
| 8,032,498 B1 * | 10/2011 | Armangau | G06F 17/30088 707/690 |
| 8,086,652 B1 * | 12/2011 | Bisson | G06F 3/0608 707/823 |
| 8,412,688 B1 | 4/2013 | Armangau et al. | |
| 8,566,371 B1 | 10/2013 | Bono et al. | |
| 9,047,299 B1 | 6/2015 | Ferrigno | |
| 9,256,614 B1 | 2/2016 | Bono et al. | |
| 9,256,629 B1 | 2/2016 | Bono et al. | |
| 9,400,741 B1 | 7/2016 | Bono et al. | |
| 9,430,492 B1 | 8/2016 | Bono et al. | |
| 2005/0246397 A1 * | 11/2005 | Edwards | G06F 17/30067 |

* cited by examiner

*Primary Examiner* — Evan Aspinwall
(74) *Attorney, Agent, or Firm* — BainwoodHuang (57) ABSTRACT

Improved techniques involve a storage processor proactively scavenging provisioned free blocks in snap container files and punching holes in the scavenged provisioned free blocks. For example, the storage processor may locate provisioned free blocks by accessing container file system metadata. The storage processor may then punch holes, i.e., release ownership of the snap container file on the identified provisioned free blocks. The storage processor may also delete or otherwise invalidate pointers to those blocks in the snap container file's inode.

18 Claims, 7 Drawing Sheets

PROACTIVE SCAVENGING OF FILE SYSTEM SNAPS

BACKGROUND

Data storage systems are arrangements of hardware and software that include storage processors coupled to arrays of non-volatile storage devices. In typical operation, storage processors service storage requests that arrive from client machines. The storage requests specify files or other data elements to be written, read, created, or deleted, for example. The storage processors run software that manages incoming storage requests and performs various data processing tasks to organize and secure the data stored on the non-volatile storage devices.

Some data storage systems implement snapshot technology to protect the data they store. For example, such a data storage system may present a file system to a client machine. The client machine accesses the file system and can make changes to its contents over time. To protect the file system and its state at various points in time, the data storage system may implement a snapshot policy and take snapshots, or "snaps," of the file system at regular intervals or in response to user commands or particular events. Each snapshot provides a point-in-time version of the file system which users of client machines can access to restore from a previous version of the file system.

SUMMARY

Some data storage systems utilize a file-based representation of data objects such as file systems, LUNs, vVols, and so forth. For example, a storage processor of a data storage system may realize an entire file system in a single container file within a container file system. The storage processor may then effect reads and writes to the file system by reads and writes on the container file representing the file system.

An active and accessible version of the file system may be referred to as a "primary object" represented in a "primary container file." A snap may then be referred to as a "snap container file." The primary container file and the snap container files typically share blocks. Unshared blocks between a primary container file and a snap container file may indicate changes in blocks of the primary container file since the snap container file was created.

Each container file, primary or snap, has an ownership share over each of its blocks. Further, some blocks of the primary or snap container file may contain no data, i.e., the blocks are "provisioned free blocks." It should be understood that snap container files may share provisioned free blocks with the primary container file, although not all provisioned free blocks are shared.

Snap container files often include a large number of provisioned free blocks. The conventional way to release provisioned free blocks from a snap is to delete the snap. Unfortunately, there are deficiencies with this conventional approach because a snap cycle could last weeks or even months, during which time the provisioned free blocks in a snap remain tied up and unavailable to be allocated to other objects.

In contrast with the above-described conventional approach in which provisioned free blocks of the snap container file remain tied up until the snap is deleted, improved techniques involve a storage processor proactively scavenging provisioned free blocks in snap container files and punching holes in the scavenged provisioned free blocks to release ownership of the snap container file over the identified provisioned free blocks. The storage processor may also delete or otherwise invalidate pointers to the punched blocks in the snap container file's inode.

Advantageously, the improved techniques serve to accelerate return of provisioned free blocks to a storage pool, where the blocks can be used by other objects sooner than they would otherwise be if one had to wait for the completion of a snap cycle.

One embodiment of the improved techniques is directed to a method of reclaiming storage space in a data storage system. The method includes storing, in a container file system realized in the data storage system, a primary container file for realizing the primary file system and a respective snap container file for realizing each of the set of snaps, the primary file system being an active and accessible version of a file system of the data storage system, each of the snaps being a respective snapshot of the primary file system at an instant of time. The method also includes identifying a set of provisioned free blocks of each of the snap container files, that snap container file having an ownership share of each of the identified set of provisioned free blocks. The method further includes, for each of identified the set of provisioned free blocks of the snap container file, releasing the ownership share of each of the snap container files on that provisioned free block.

Additionally, some embodiments of the improved technique are directed to a system constructed and arranged to reclaim storage space in a data storage system. The system includes memory and a controller including controlling circuitry constructed and arranged to carry out the method of reclaiming storage space in a data storage system.

Further, some embodiments of the improved technique are directed to a computer program product having a non-transitory computer readable storage medium that stores code including a set of instructions which, when executed by a computer, cause the computer to carry out the method of reclaiming storage space in a data storage system.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques involve a storage processor proactively scavenging provisioned free blocks in snap container files and punching holes in the scavenged provisioned free blocks. Advantageously, the improved techniques serve to accelerate return of provisioned free blocks to a storage pool, where the blocks can be used by other objects sooner than they would be if one had to wait for the completion of a snap cycle.

Figure 1:
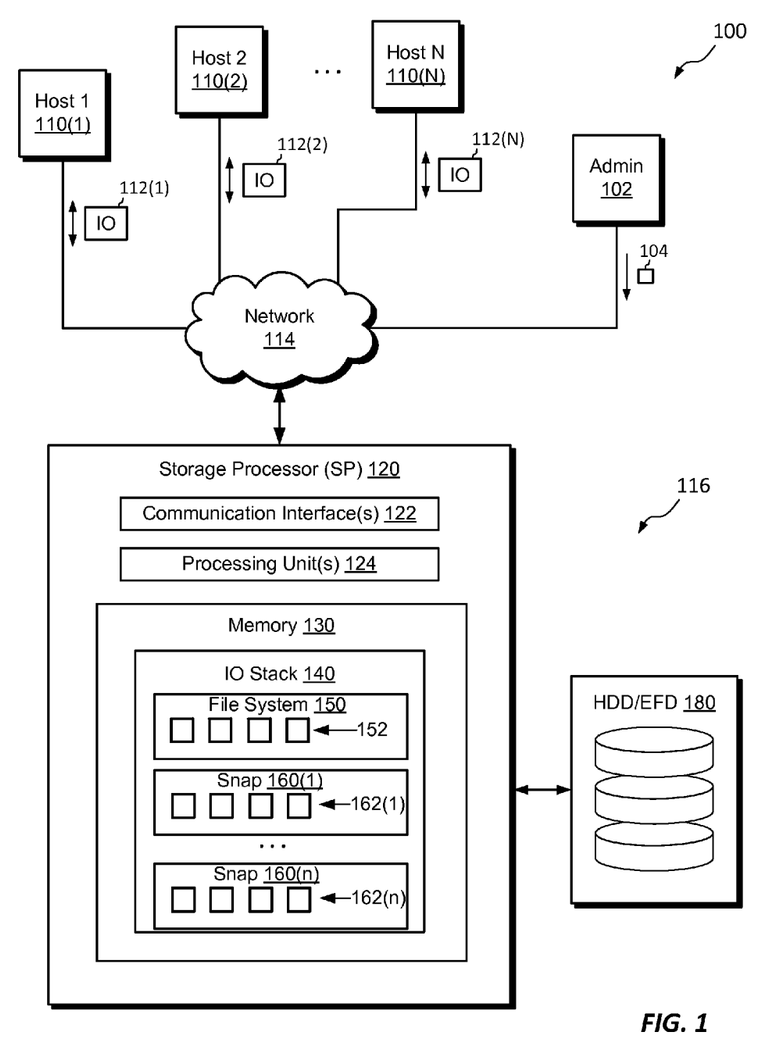
FIG. 1 is a block diagram illustrating an example electronic environment in which the improved technique can be carried out.

FIG. 1 shows an example electronic environment 100 in which embodiments of the improved techniques hereof can be practiced. Here, multiple host computing devices ("hosts") 110(1) through 110(N) access a data storage apparatus 116 over a network 114. The data storage apparatus 116 includes a storage processor, or "SP," 120 and storage 180. The storage 180 is provided, for example, in the form of hard disk drives and/or electronic flash drives. The data storage apparatus 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs. Additional information about data storage systems in which the improved technique hereof can be practiced is found in U.S. patent application Ser. No. 13/828,322, filed Mar. 14, 2013, the contents and teachings of which are incorporated by reference herein in their entirety.

The network 114 can be any type of network or combination of networks, such as a storage area network (SAN), local area network (LAN), wide area network (WAN), the Internet, and/or some other type of network, for example. In an example, the hosts 110(1-N) can connect to the SP 120 using various technologies, such as Fibre Channel (e.g., through a SAN), iSCSI, NFS, SMB 3.0, and CIFS. Any number of hosts 110(1-N) may be provided, using any of the above protocols, some subset thereof, or other protocols besides those shown. The SP 120 is configured to receive IO requests 112(1-N) and to respond to such IO requests 112(1-N) by reading and/or writing the storage 180. An administrative machine 102 may also communicate over the network 114 with the SP 120, e.g., via requests 104.

The SP 120 is seen to include one or more communication interfaces 122, a set of processing units 124, and memory 130. The communication interfaces 122 include, for example, adapters, such as SCSI target adapters and network interface adapters, for converting electronic and/or optical signals received from the network 114 to electronic form for use by the SP 120. The set of processing units 124 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons, for example.

The memory 130 is seen to include (i.e., to realize by operation of programming code) an IO stack 140. The IO stack 140 provides an execution path for host IOs (e.g., IO requests 112(1-N)) and includes an internal representation of a file system 150. The IO stack 140 also provides snaps 160(1), . . . , 160(n) of file system 150. Snaps 160(1), . . . , 160(n) each are versions of file system 150 at particular instants in time. File system 150 is realized in a primary container file, and snaps 160(1), . . . , 160(n) are each realized in a respective snap container file. In this case, file system 150, as a primary container file, has an inode that contains block pointers 152. Similarly, snaps 160(1), . . . , 160(n), as snap container files, each have inodes that contain respective sets of block pointers 162(1), . . . , 162(n). It should be understood that the file system 150 and snaps 160(1), . . . , 160(n) are logical constructs within the IO stack 140 and that the underlying data and metadata that support these structures typically reside in the storage 180. Although only a single file system 150 and associated snaps are shown, it should be understood that SP 120 may host any number of file systems, like the file system 150, limited only by available computing resources and storage.

It should be understood that each of the block pointers 162(1), . . . , 162(n) in snaps 160(1), . . . , 160(n) represent versions of block pointers 152 in the file system 150 at some instant in time. Thus, at least some of block pointers 162(1), . . . , 162(n) may point to the same address in physical storage as respective block pointers 152. Blocks that are pointed to by different container files are shared between those files.

During operation, SP 120 receives a command 104 to scavenge from one or more of the snap container files 160(1), . . . , 160(n). In response to command 104, SP 120 identifies any provisioned free blocks in one or more snap container file 160(1), . . . , 160(n). For example, SP 120 may determine which blocks of a snap container file are provisioned free blocks by accessing metadata associated with a container file system, such as a slice map, CG headers, and the like.

Once SP 120 identifies any provisioned free blocks in a snap container file 160(1), . . . , 160(n), SP 120 may then issue a punch hole command to release the ownership share of that snap container file on each of its set of provisioned free blocks. SP 120 may also delete or otherwise invalidate the pointers to the physical addresses of the provisioned free blocks from the inode structures of the respective snap container file. It should be understood, however, that not every provisioned free block of a snap container file need be identified before commencing with hole punching.

Figure 2:
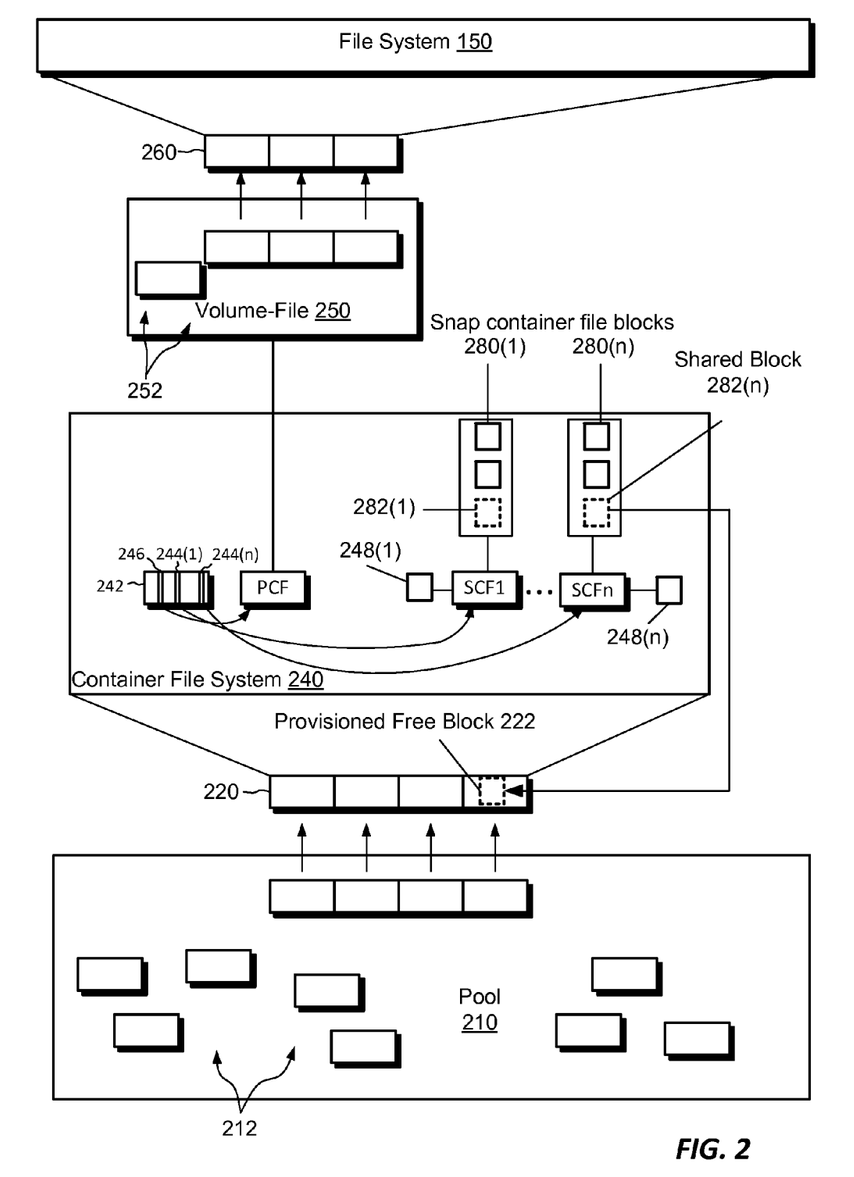
FIG. 2 is a diagram illustrating an example file system and its snaps within the electronic environment shown in FIG. 1.

FIG. 2 shows an example implementation of the IO stack 140 of FIG. 1 in additional detail. Here, the file system 150 is seen to be built upon numerous layers. At the bottom can be seen a storage pool 210. The storage pool 210 manages a repository of storage units in the form of "slices" 212. In an example, slices 212 are formed from RAID (Redundant Array of Independent Disks) groups composed of multiple disk drives or solid state drives and/or the like, which are housed in the storage 180 (FIG. 1). In an example, each slice 212 provides 1 GB of storage space, which the IO stack 140 may provision on demand to fulfill storage requests. Here, it is seen that the IO stack 140 has provisioned four slices from the pool 210 to form a sparse metavolume 220, which provides a contiguous address space for supporting a container file system 240.

The container file system 240 is internal to the IO stack 140 and is generally hidden from users. In general, a container file system 240 may contain only a single file (a container file), or may contain both a container file and any snaps of the container file. In the example shown in FIG. 2, the container file system 240 has a primary container file, "PCF" and snap container files, "SCF1", . . . , "SCFn." In this example, PCF is a file-based realization of the file system 150, and SCF1, . . . , SCFn are snaps of the PCF.

The container file system 240 is further seen to include an inode table 242 having an inode 244 for the primary container file PCF and inodes 246(1), . . . , 246(n) for the respective snap container files SCF1, . . . , SCFn. The inodes 244 and 246(1), . . . , 246(n) each have a unique inode number in the container file system 240 and each include block pointers that point to data blocks of the sparse metavolume 220 where the file content of the respective files is stored.

The container file system 240 has a volume-based interface and expresses container files using volume-file constructs. Here, volume file 250 expresses primary container file PCF with volume semantics (e.g., SCSI semantics; note that a punch hole operation may be implemented as a SCSI command). The volume file 250 also provides a local pool-like object for creating upper-deck slices 252, which the volume file 250 may provision on demand to fulfill storage requests. Here, it is seen that three slices have been provisioned from the volume file 250 to form an upper-deck sparse metavolume 260, which provides a contiguous address space for supporting the file system 150 (i.e., an upper deck file system).

Each of the snap container files SCF1, . . . , SCFn has respective snap container file blocks 280(1), . . . , 280(n). Blocks 280(1), . . . , 280(n) represent physical blocks that constitute the respective container files. In the example illustrated in FIG. 2, the physical blocks are located within sparse metavolume 220. Blocks 280(1) and 280(n) as illustrated contain respective shared blocks 282(1) and 282(n) each having a respective ownership share.

During operation, SP 120 determines, e.g., from a slice map associated with container system 240, which slices of storage in underlying metavolume 220 contain the blocks 280(1), . . . , 280(n) of snap container files SCF1, . . . , SCFn. SP 120 may also deduce from the slice map which slices contain provisioned free blocks of storage. SP 120 may then investigate which of the blocks 162 of the snap container file system 160 are provisioned free blocks by examining the blocks of the slices containing free blocks of storage.

Assume, for example, that SP 120 has found blocks 282(1) and 282(n) to be provisioned free blocks. Then SP 120 determines from respective inodes 244(1) and 244(n) that blocks 282(1) and 282(n) are shared blocks because they each point to the same address in underlying sparse metavolume 220. SP 120 then punches holes in blocks 282(1) and 282(n) to release respective ownership shares of shared blocks. SP 120 also removes or otherwise invalidates the corresponding block pointers from inodes 244(1) and 244(n).

In some arrangements, each snap container file SCF1, . . . , SCFn, includes metadata 248(1), . . . , 248(n) indicating whether it has had its respective provisioned free blocks scavenged. In this case, prior to identifying provisioned free blocks of a snap container file, say, SCF1, SP 120 checks metadata 248(1) of SCF1 to see whether has already been scavenged. If so, then SP 120 may perform no action. If not, then upon completing a scavenging operation, e.g., by releasing the ownership share of a snap container file SCF1 on each of its provisioned free blocks, SP 120 writes information in metadata 248(1) of the snap container file SCF1 indicating that the snap container file SCF1 has been scavenged.

One possible use case involves receiving a command to punch holes in snap container files as a result of a reclaim command issued by admin 102 (FIG. 1). Details of an example reclaim operation are shown in connection with FIGS. 3A, 3B, and 3C.

Figure 3A:
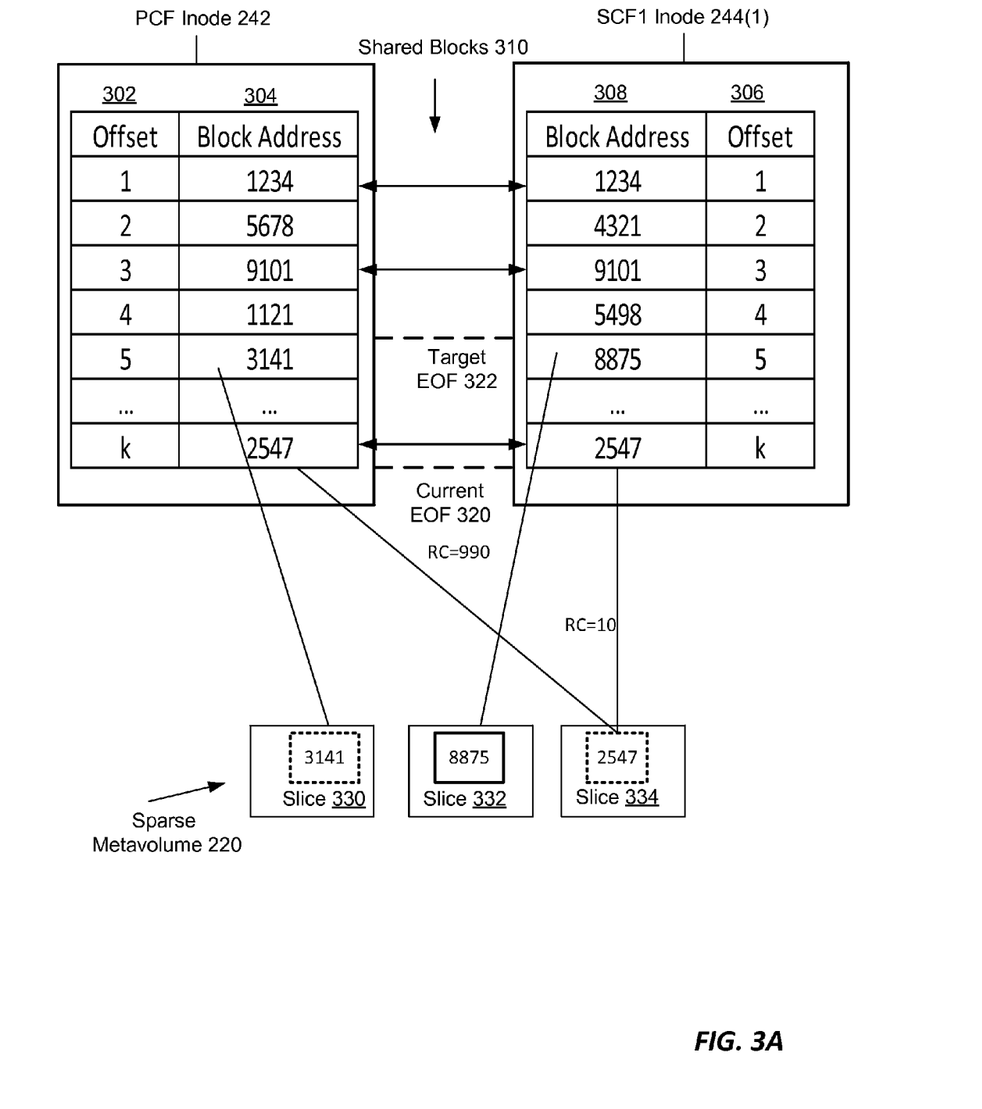
FIGS. 3A, 3B, and 3C are block diagrams illustrating an example reclaim operation carried out in the presence of snaps within the electronic environment shown in FIG. 1.

FIG. 3A illustrates portions of container file system 240, including primary container file inode 246, snap container file inode 244(1), and underlying sparse metavolume 220. PCF inode 246 provides a mapping between block offsets 302 into PCF and the block addresses 304 in sparse metavolume 220. Similarly, SCF1 inode 244(1) provides a mapping between block offsets 306 into SCF1 and the block addresses 308 in sparse metavolume 220. In the example shown, PCF and SCF1 each have k blocks.

As illustrated in FIG. 3A, PCF and SCF1 have shared blocks 310 at offset positions 1, 3, and k. However, there are no shared blocks at offset positions 2, 4, and 5.

As part of an example reclaim operation, SP 120 sets a target EOF pointer 322 after offset position 4. A current EOF pointer 320 already exists after position k. In this case, a reclaim operation involves examining blocks beyond offset position 4. The pointer at offset 5 in PCF points to block address 3141 within slice 330 in sparse metavolume 220, while the pointer at offset 5 in SCF1 points to block address 8875 within slice 332 sparse metavolume 220. However, the pointers after offset k in both PCF and SCF1 point to shared block 2547 in slice 340 of sparse metavolume 220. The reclaim operation involves moving data from blocks beyond target EOF pointer 322 to blocks within target EOF pointer 322.

In some arrangements, the respective ownership shares of PCF and SCF1 on shared block 2547 may be expressed through a reference count. The reference count indicates how ownership shares for a block are allocated among files, e.g., a primary file system and its snaps. For example, SP 120 compares a reference count assigned to a relationship between a container file and a block in the sparse metavolume 220 to a reference count in the block metadata of the block. Along these lines, a relationship between a primary container file and a block in sparse metavolume 220 may have a reference count of 1000; comparing this reference count with a count of 1000 in the block metadata reveals that the block is exclusively owned by the primary container file. Thus, reference count 340 of PCF on block 3141 is 1000 and reference count 340 of SCF1 on block 8875 is also 1000. On the other hand, reference count 340 of PCF on block 2547 is 990 and that of SCF1 on block 2547 is 10; these reference counts indicate that block 2547 is shared.

Figure 3B:
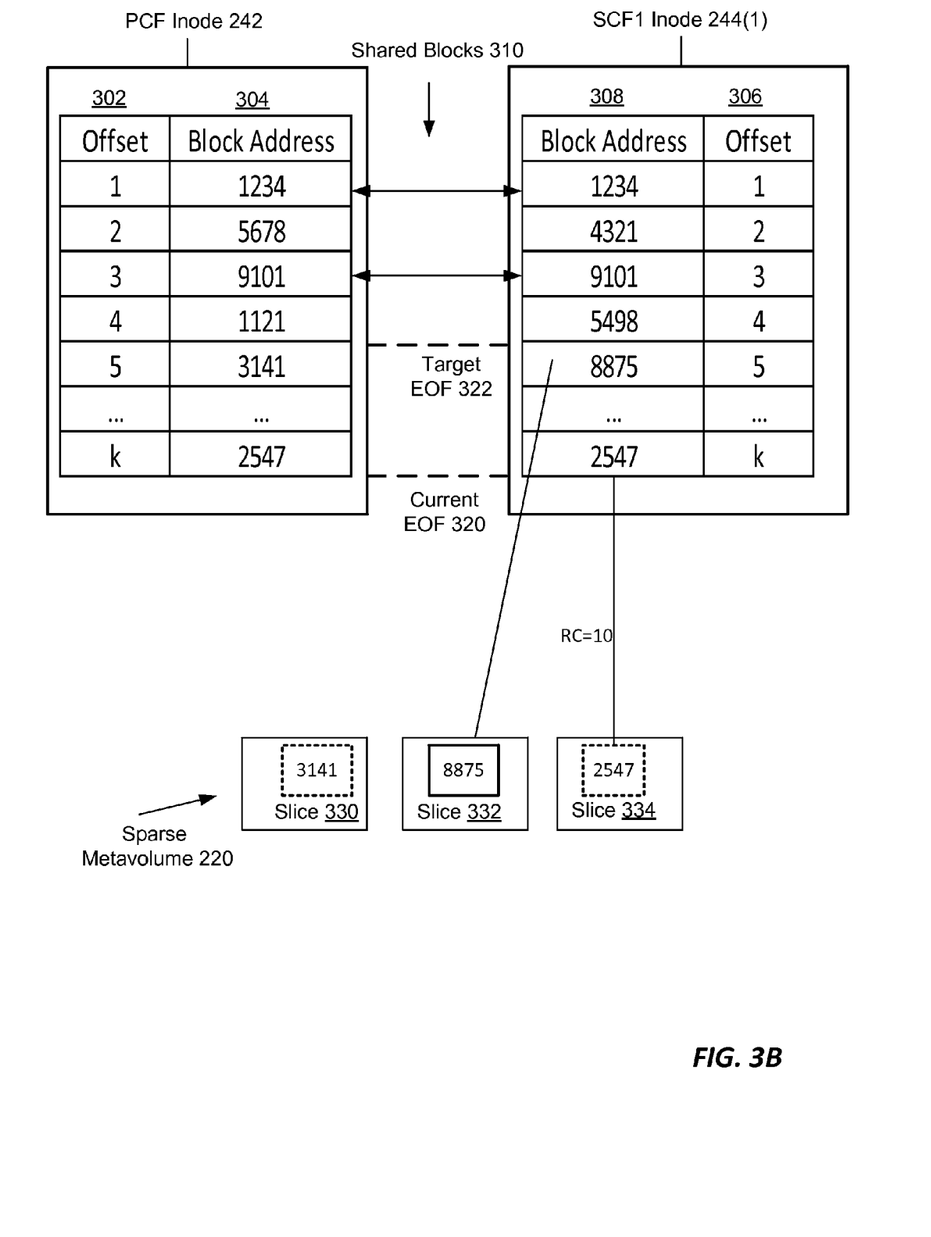

FIG. 3B illustrates portions of container file system 240 as in FIG. 3A, in the next stage of the reclaim operation. In FIG. 3B, SP 120 releases the ownership shares of PCF on blocks beyond target EOF 322. (Presumably, SP 120 has previously moved data in block 3141 to another available block within target EOF 322.)

Figure 3C:
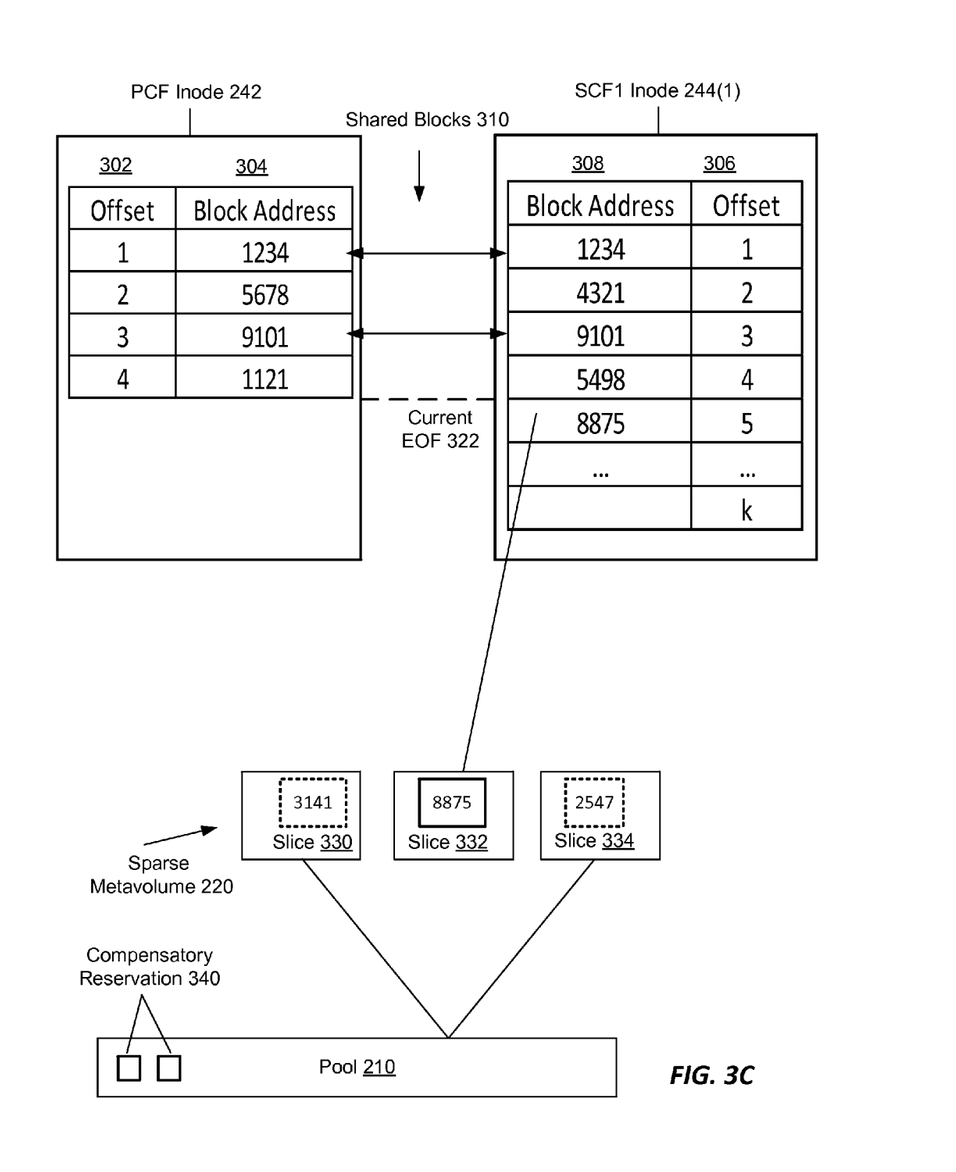

FIG. 3C illustrates portions of container file system 240 as in FIGS. 3A and 3B, in the final stage of the reclaim operation. In FIG. 3B, SP 120 punches holes to release the ownership shares of SCF1 on block 2547. SP 120 may later reorganize the released blocks within a slice and return the slice back to storage pool 210.

It should be understood that SP 120 may truncate PCF to the target EOF anytime once data in PCF has been moved within target EOF pointer 322. As illustrated in FIG. 3C, however, the truncation of PCF is shown in this final stage of the reclaim operation.

In the case of thickly provisioned file system 150, the amount of storage reserved for use by file system 150 is fixed. Thus, for every block in file system 150 that is hole-punched, SP 120 obtains a compensatory reservation 350 in order to keep the amount of reserved storage fixed for file system 150.

Figure 4:
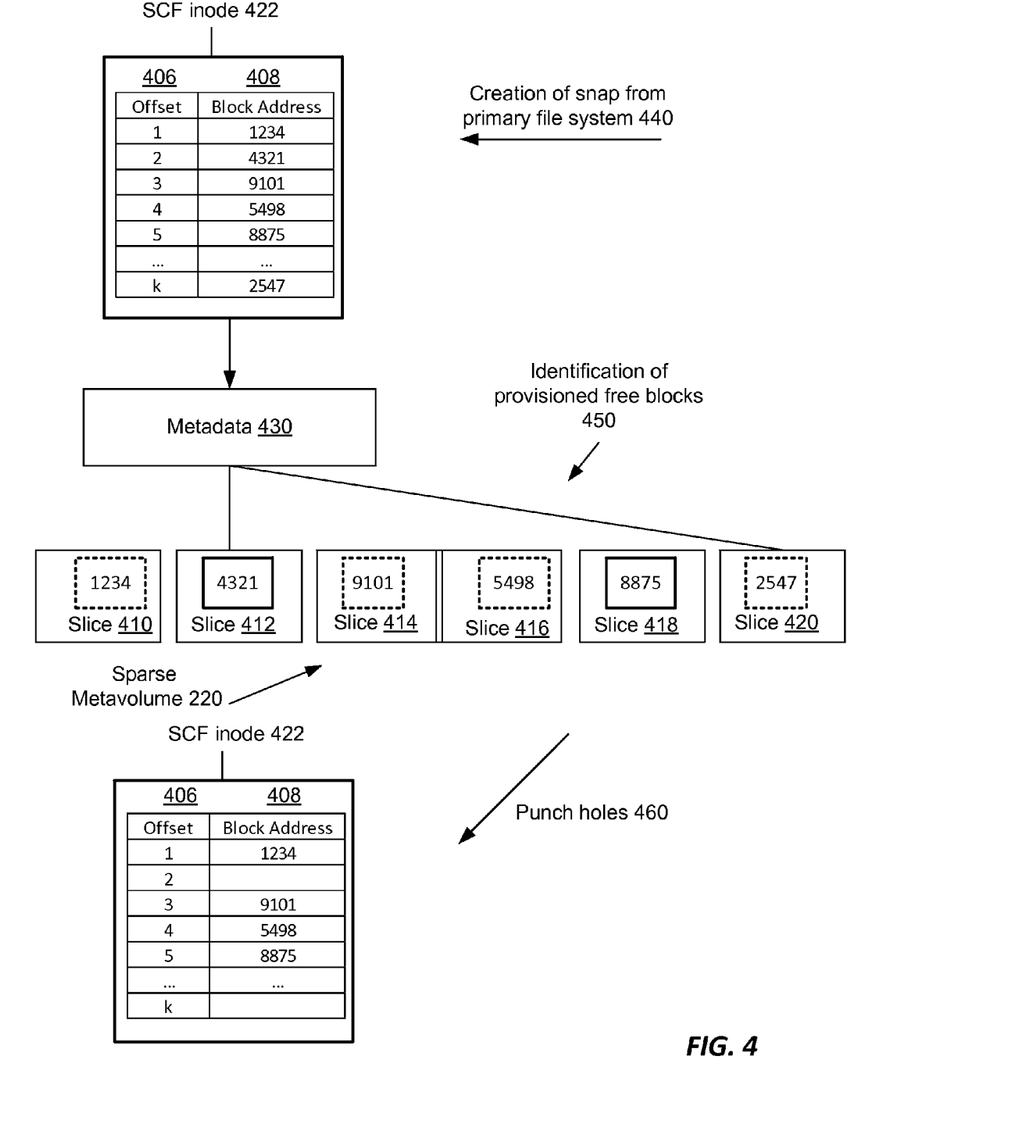
FIG. 4 is a block diagram illustrating an example hole punching operation for newly created snaps within the electronic environment shown in FIG. 1.

FIG. 4 illustrates another use case in which SP 120 scavenges provisioned free blocks of a newly created snap container file SCF. In this case, SP 120 creates a new snap realized within a new snap container file having inode 422 with offsets 406 and corresponding block addresses 408.

In order to carry out this scavenging operation, SP 120 punches holes in the provisioned free blocks of the new SCF. In this case, SP 120 accesses metadata 430 of the new SCF. For example, metadata 430 may include a slice map associated with lower deck file system 240, a CG header bitmap, and/or other metadata.

In the example illustrated in FIG. 4, block addresses 4321 and 2547 in slices 412 and 420, respectively, of the sparse metavolume 220 are indicated as provisioned free blocks according to metadata 430. SP 120 then releases the ownership shares of the new SCF on block addresses 4321 and 2547 by punching holes. SP 120 may remove the pointers to these provisioned free blocks in inode 422.

In some arrangements, SP 120 punches holes in the primary container file PCF at the same offsets as the provisioned free blocks of the new SCF and punches holes in block addresses 4321 and 2547 in the snap.

Figure 5:
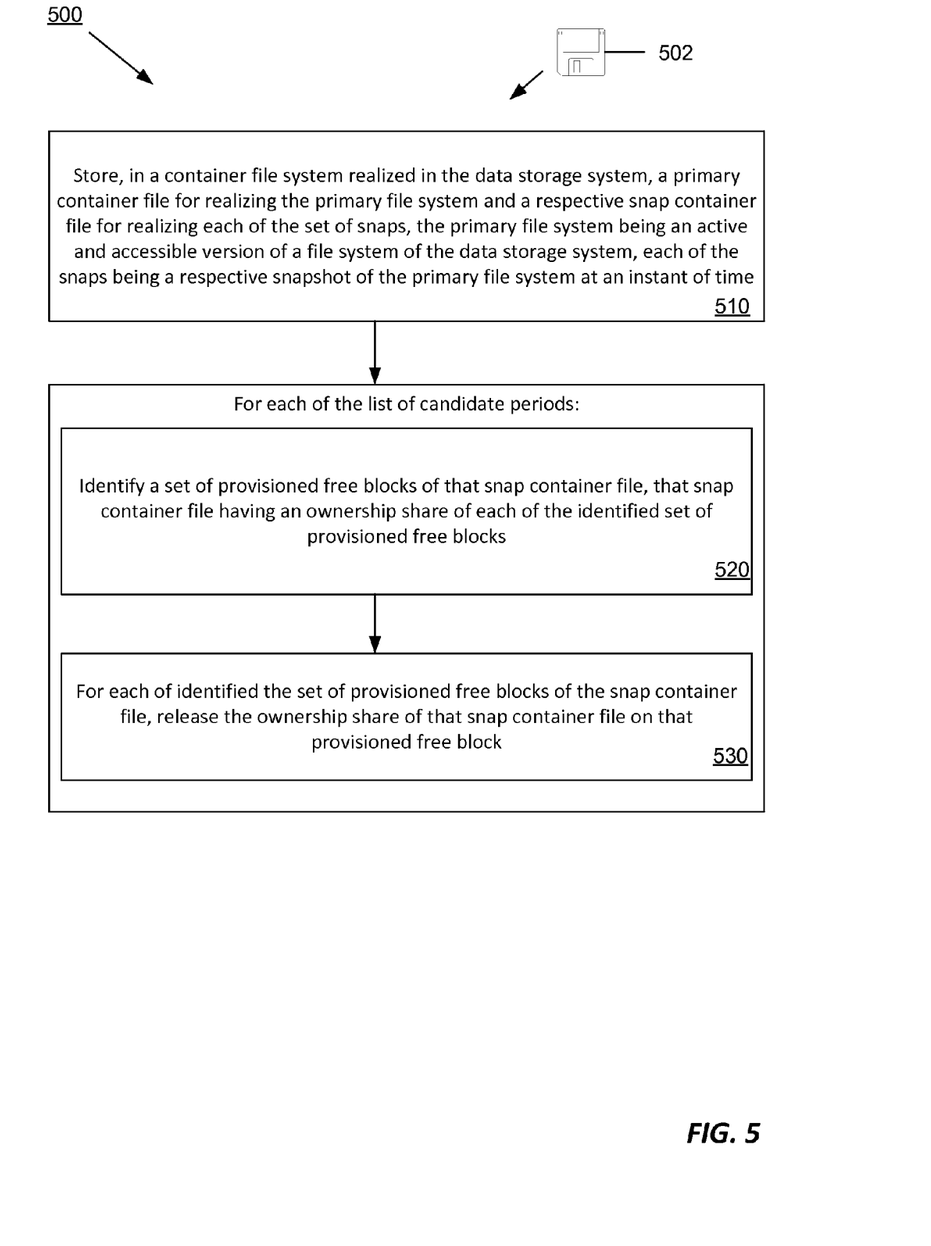
FIG. 5 is a flow chart illustrating an example method of carrying out the improved technique within the electronic environment shown in FIG. 1.

FIG. 5 illustrates a method 500 of reclaiming storage space in a data storage system, including steps 502, 504, and 506.

In step 502, a storage processor stores, in a container file system realized in the data storage system, a primary container file for realizing the primary file system and a respective snap container file for realizing each of the set of snaps, the primary file system being an active and accessible version of a file system of the data storage system, each of the snaps being a respective snapshot of the primary file system at an instant of time. For example, SP 120 realizes primary file system 150 in primary container file PCF, and realizes snaps of primary file system 150 in snap container files SCF1, . . . , SCFn.

In step 504, the storage processor identifies a set of provisioned free blocks of each of the snap container files, that snap container file having an ownership share of each of the identified set of provisioned free blocks. For example, SP 120 may inspect metadata 430 as part of a proactive hole punching operation in which SP 120 punches holes in provisioned free blocks of snap container files as they are created. In this case, SP 120 may subsequently punch holes in the primary container file to avoid write splits.

In step 506, the storage processor, for each of identified the set of provisioned free blocks of the snap container file, releases the ownership share of each of the snap container files on that provisioned free block. For example, SP 120 may adjust a reference count of a relationship between a container file and a block in sparse metavolume 240 in response to a punch hole operation. SP 120 may also remove a pointer to that block in the respective inode.

Improved techniques involve a storage processor of a data storage system proactively scavenging snap images for provisioned free blocks and punching holes in such blocks to release the snaps' ownership shares on the provisioned free blocks. Advantageously, the improved techniques serves to accelerate return of such blocks to the storage pool, where the blocks can be used by other objects sooner than they would be if one had to wait for the completion of a snap cycle. SP 120 is able to accomplish such techniques by locating provisioned free blocks in snap container files that realize the snaps of file system 150.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to data storage apparatus 116 containing storage processor 120, which is constructed and arranged to reclaim storage space in a data storage system. Some embodiments are directed to a process of reclaiming storage space in a data storage system. Also, some embodiments are directed to a computer program product that enables computer logic to cause a computer to reclaim storage space in a data storage system in a computing environment.

In some arrangements, storage processor 120 is implemented by a set of cores or other types of control/processing circuitry running software. In such arrangements, the software instructions can be delivered, within storage processor 120, either in the form of a computer program product 502, or simply instructions on disk or pre-loaded in memory 130 of data storage system 116, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of reclaiming storage space in a data storage system, the method comprising:
   storing, in a container file system realized in the data storage system, a primary container file for realizing the primary file system and a respective snap container file for realizing each of the set of snaps, the primary file system being an active and accessible version of a file system of the data storage system, each of the snaps being a respective snapshot of the primary file system at an instant of time;
   for each of the snap container files:
      identifying a set of provisioned free blocks of that snap container file, that snap container file having an ownership share of each of the identified set of provisioned free blocks; and
      for each of the identified set of provisioned free blocks of the snap container file, releasing the ownership share of that snap container file on that provisioned free block,
   wherein each of the snap container files includes a snap container file inode, the snap container file inode of each respective snap container file including pointers that point to each block of that snap container file; and
   wherein the method further comprises, for each of the snap container files, when releasing the ownership share of that snap container file on each of the set of provisioned free blocks, also removing the pointer of the snap container file inode that points to that provisioned free block, and wherein the method further comprises:
   receiving a request to perform a shrink operation on the primary file system;
   in response to the request, identifying a target address to which an end-of-file pointer of the primary container file is to be moved from a current address;

identifying a set of provisioned free blocks of the primary container file, each of the set of provisioned free blocks of the primary container file having an address between the target address and the current address; and for each of the set of provisioned free blocks of the primary container file, releasing the ownership share of the primary container file on that provisioned free block.

2. A method as in claim 1, wherein, for each of the snap container files, identifying the set of provisioned free blocks of that snap container file includes:

verifying that the snap container file inode of that snap container file has pointers that point to the same blocks as corresponding pointers of a primary container file inode of the primary container file, the corresponding blocks of the primary container file having the same addresses as the blocks of that snap container file; and labeling the blocks of that snap container as the provisioned free blocks of that snap container file.

3. A method as in claim 2, wherein releasing the ownership share of each of the snap container files on each of the set of provisioned free blocks of the snap container file includes:

obtaining a reference count of that provisioned free block; and adjusting the reference count of that provisioned free block to reflect that the ownership share of that snap container file on that provisioned free block has been relinquished.

4. A method as in claim 2, wherein the file system is thickly provisioned in that the file system is guaranteed a specified amount of storage from a storage pool; and wherein, upon releasing the ownership share of each of the set of snap container files on each of the set of provisioned free blocks of that snap container file includes increasing, the method further comprises increasing a reservation of storage space in the storage pool by the amount of storage contained in a provisioned free block.

5. A method as in claim 1, further comprising creating a new snap of the primary file system, the new snap being realized in a new snap container file having a new snap container file inode;

wherein identifying the set of provisioned free blocks of each of the set of snap container files includes locating, upon the creation of the new snap, each provisioned free block of the new snap container file; and wherein releasing the ownership share of each of the set of snap container files on each of the set of provisioned free blocks of that snap container file includes removing the pointer of the new snap container file inode that points to a provisioned free block of the new snap container file.

6. A method as in claim 5, further comprising releasing the ownership share of the primary container file on blocks of the primary container file that have the same addresses as the provisioned free blocks of that snap container file after releasing the ownership share of each of the set of snap container files on each of the set of provisioned free blocks of that snap container file.

7. A method as in claim 1, further comprising expressing the primary container file as a volume file on which SCSI commands processed by a storage processor of the data storage system are executed; and wherein, for each of the snap container files, releasing the ownership share of each of the set of provisioned free blocks of that snap container file includes executing, by the storage processor, a punch hole command, the punch hole command being a SCSI command for releasing an ownership share of a file on a block.

8. A method as in claim 1, wherein each of the snap container files has metadata containing information indicating whether that snap container has had its ownership share of each of its identified set of provisioned free blocks released; and wherein the method further comprises, for each of the snap container files, writing, upon releasing the ownership share of that snap container file on each of the set of provisioned free blocks, information in the metadata of that snap container file indicating that that snap container file has had its ownership share of each of its identified set of provisioned free blocks released.

9. A data storage system comprising a storage processor including a controller, the controller including memory and controlling circuitry coupled to the memory, the controlling circuitry being constructed and arranged to:

store, in a container file system realized in the data storage system, a primary container file for realizing the primary file system and a respective snap container file for realizing each of the set of snaps, the primary file system being an active and accessible version of a file system of the data storage system, each of the snaps being a respective snapshot of the primary file system at an instant of time;

for each of the snap container files:

identify a set of provisioned free blocks of that snap container file, that snap container file having an ownership share of each of the identified set of provisioned free blocks; and for each of the identified set of provisioned free blocks of the snap container file, release the ownership share of that snap container file on that provisioned free block, wherein each of the snap container files includes a snap container file inode, the snap container file inode of each respective snap container file including pointers that point to each block of that snap container file; and wherein the controlling circuitry is further constructed and arranged to, for each of the snap container files, when releasing the ownership share of that snap container file on each of the set of provisioned free blocks, also remove the pointer of the snap container file inode that points to that provisioned free block, and wherein the controlling circuitry is further constructed and arranged to:

receive a request to perform a shrink operation on the primary file system;

in response to the request, identify a target address to which an end-of-file pointer of the primary container file is to be moved from a current address;

identify a set of provisioned free blocks of the primary container file, each of the set of provisioned free blocks of the primary container file having an address between the target address and the current address; and for each of the set of provisioned free blocks of the primary container file, release the ownership share of the primary container file on that provisioned free block.

10. A system as in claim 9,
wherein, for each of the snap container files, the controlling circuitry constructed and arranged to identify the set of provisioned free blocks of that snap container file is further constructed and arranged to:
verify that the snap container file inode of that snap container file has pointers that point to the same blocks as corresponding pointers of a primary container file inode of the primary container file, the corresponding blocks of the primary container file having the same addresses as the blocks of that snap container file; and
label the blocks of that snap container as the provisioned free blocks of that snap container file.

11. A system as in claim 10, wherein the controlling circuitry constructed and arranged to release the ownership share of each of the snap container files on each of the set of provisioned free blocks of the snap container file is further constructed and arranged to:
obtain a reference count of that provisioned free block; and
adjust the reference count of that provisioned free block to reflect that the ownership share of that snap container file on that provisioned free block has been relinquished.

12. A system as in claim 10, wherein the file system is thickly provisioned in that the file system is guaranteed a specified amount of storage from a storage pool; and
wherein, upon releasing the ownership share of each of the set of snap container files on each of the set of provisioned free blocks of that snap container file includes increasing, the controlling circuitry is further constructed and arranged to increase a reservation of storage space in the storage pool by the amount of storage contained in a provisioned free block.

13. A system as in claim 9, wherein the controlling circuitry is further constructed and arranged to create a new snap of the primary file system, the new snap being realized in a new snap container file having a new snap container file inode;
wherein the controlling circuitry constructed and arranged to identify the set of provisioned free blocks of each of the set of snap container files is further constructed and arranged to locate, upon the creation of the new snap, each free block of the new snap container file; and
wherein the controlling circuitry constructed and arranged to release the ownership share of each of the set of snap container files on each of the set of provisioned free blocks of that snap container file is further constructed and arranged to remove the pointer of the new snap container file inode that points to a free block of the new snap container file.

14. A system as in claim 9, wherein the controlling circuitry is further constructed and arranged to express the primary container file as a volume file on which SCSI commands processed by a storage processor of the data storage system are executed; and
wherein, for each of the snap container files, the controlling circuitry constructed and arranged to release the ownership share of each of the set of provisioned free blocks of that snap container file is further constructed and arranged to execute, by the storage processor, a punch hole command, the punch hole command being a SCSI command for releasing an ownership share of a file on a block.

15. A computer program product comprising a non-transitory, computer-readable storage medium which stores executable code, which when executed by a storage processor of a data storage system, causes the storage processor to perform a method of reclaiming storage space in a data storage system including a primary file system and a set of snaps of the primary file system, the method comprising:
storing, in a container file system realized in the data storage system, a primary container file for realizing the primary file system and a respective snap container file for realizing each of the set of snaps, the primary file system being an active and accessible version of a file system of the data storage system, each of the snaps being a respective snapshot of the primary file system at an instant of time;
for each of the snap container files:
identifying a set of provisioned free blocks of that snap container file, that snap container file having an ownership share of each of the identified set of provisioned free blocks; and
for each of the identified set of provisioned free blocks of the snap container file, releasing the ownership share of that snap container file on that provisioned free block,
wherein the method further comprises:
receiving a request to perform a shrink operation on the primary file system;
in response to the request, identifying a target address to which an end-of-file pointer of the primary container file is to be moved from a current address;
identifying a set of provisioned free blocks of the primary container file, each of the set of provisioned free blocks of the primary container file having an address between the target address and the current address; and
for each of the set of provisioned free blocks of the primary container file, releasing the ownership share of the primary container file on that provisioned free block.

16. A method as in claim 15, wherein each of the snap container files includes a snap container file inode, the snap container file inode of each respective snap container file including pointers that point to each block of that snap container file; and
wherein the method further comprises, for each of the snap container files, when releasing the ownership share of that snap container file on each of the set of provisioned free blocks, also removing the pointer of the snap container file inode that points to that provisioned free block.

17. A method as in claim 16
wherein, for each of the snap container files, identifying the set of provisioned free blocks of that snap container file includes:
verifying that the snap container file inode of that snap container file has pointers that point to the same blocks as corresponding pointers of a primary container file inode of the primary container file, the corresponding blocks of the primary container file having the same addresses as the blocks of that snap container file; and
labeling the blocks of that snap container as the provisioned free blocks of that snap container file.

18. A method as in claim 16, wherein releasing the ownership share of each of the snap container files on each of the set of provisioned free blocks of the snap container file includes:

obtaining a reference count of that provisioned free block; and adjusting the reference count of that provisioned free block to reflect that the ownership share of that snap container file on that provisioned free block has been relinquished.

* * * * *